(12) United States Patent
Biltoft

(10) Patent No.: US 6,254,773 B1
(45) Date of Patent: Jul. 3, 2001

(54) MICROPOROUS MEMBRANE FILTRATION ASSEMBLY

(75) Inventor: Bruce G. Biltoft, Chatswood (AU)

(73) Assignee: USF Filtration and Separations Group, Inc., Timonium, MD (US)

( * ) Notice: Subject to any disclaimer, the term of this patent is extended or adjusted under 35 U.S.C. 154(b) by 0 days.

(21) Appl. No.: 09/283,690

(22) Filed: Mar. 31, 1999

Related U.S. Application Data

(63) Continuation of application No. PCT/AU97/00835, filed on Dec. 9, 1997, now abandoned.

(30) Foreign Application Priority Data

Dec. 10, 1996 (AU) .................................................. PO4125

(51) Int. Cl.⁷ .................................................. B01D 63/00
(52) U.S. Cl. .................................. 210/321.8; 210/321.89
(58) Field of Search ........................... 210/321.8, 321.89, 210/321.78–321.81, 321.87–321.9

(56) References Cited

U.S. PATENT DOCUMENTS

| | | | |
|---|---|---|---|
| 4,214,990 | * | 7/1980 | Joh . |
| 4,293,419 | * | 10/1981 | Sekino . |
| 4,435,289 | * | 3/1984 | Breslau . |
| 4,451,369 | | 5/1984 | Sekino et al. . |
| 4,670,145 | | 6/1987 | Edwards . |
| 4,906,362 | * | 3/1990 | Holm . |
| 5,071,552 | * | 12/1991 | Bikson ............................... 210/321.8 |
| 5,137,631 | | 8/1992 | Eckman et al. . |
| 5,160,042 | * | 11/1992 | Bikson ............................... 210/321.8 |
| 5,169,530 | * | 12/1992 | Schucker . |
| 5,282,964 | * | 2/1994 | Young . |
| 5,405,528 | * | 4/1995 | Selbie et al. ......................... 210/232 |
| 5,470,469 | * | 11/1995 | Eckman ............................ 210/321.8 |
| 5,906,739 | * | 5/1999 | Osterland et al. . |

* cited by examiner

Primary Examiner—Chester T. Barry
(74) Attorney, Agent, or Firm—Knobbe, Martens, Olson & Bear LLP

(57) ABSTRACT

A filter assembly 1 comprising an elongate housing 2 having therein a plurality of discrete filter bundle lengths 3 disposed end to end in a series configuration. Each filter bundle length 3 comprises a multitude of micro-porous polymeric hollow fibers of the kind wherein feed to be filtered is fed to the outside of the bundle of fibers and permeate is extracted from one or both permeate discharge ends 4 of the fiber lumens. The system also includes one or more longitudinally extending feed passages 6 and 7 and one or more longitudinally extending permeate return passages, each of the permeate return passages being in fluid flow communication with each of the permeate discharge ends 4 of the fiber lumens, desirably via connecting passages 9.

12 Claims, 8 Drawing Sheets

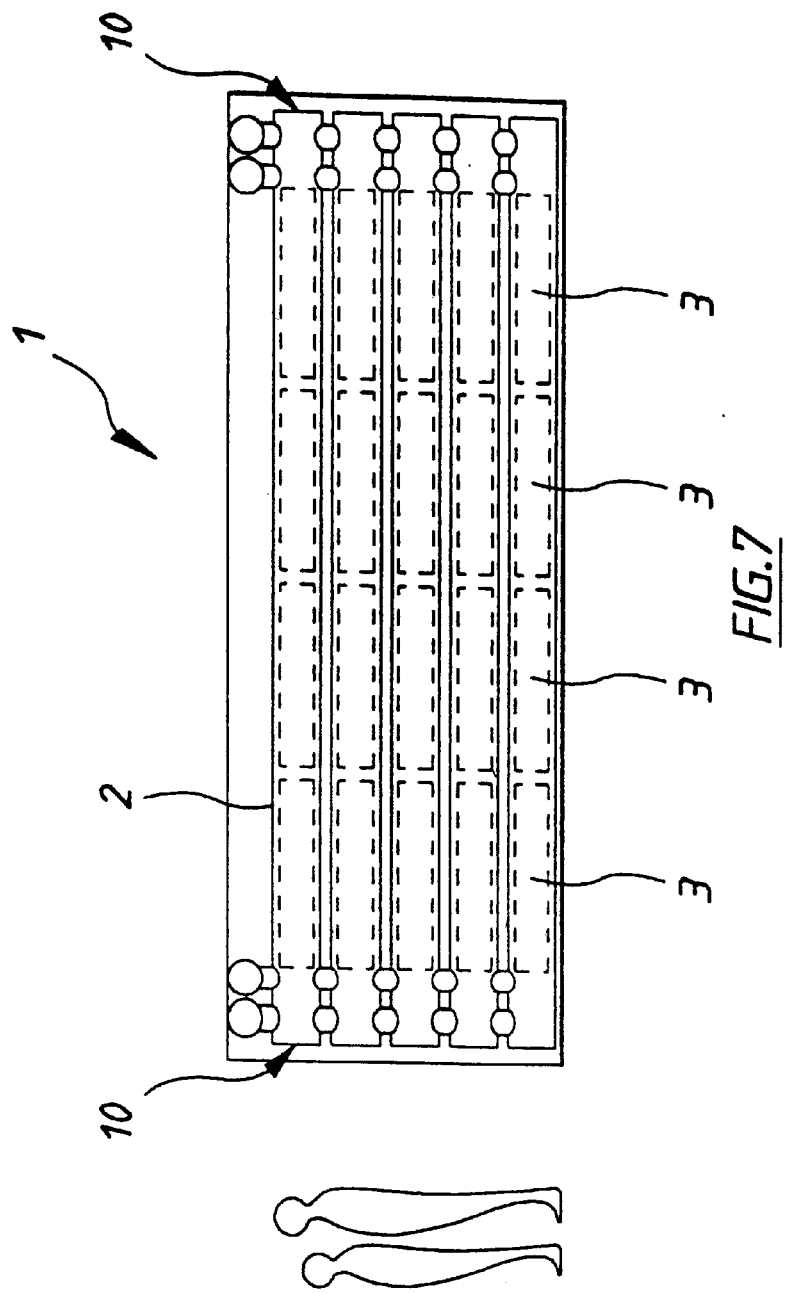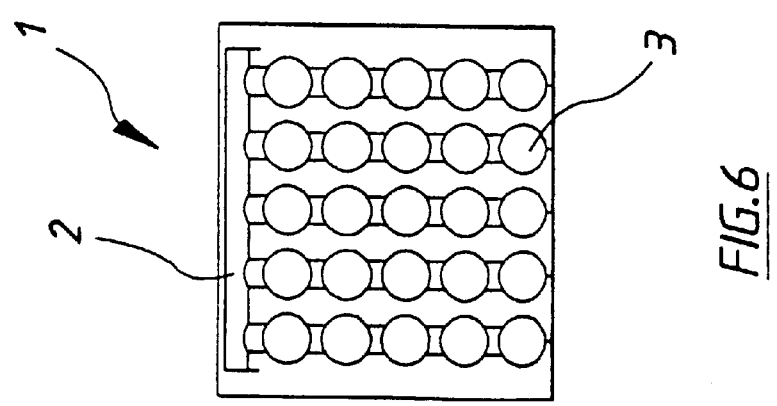

MICROPOROUS MEMBRANE FILTRATION ASSEMBLY

This application is a continuation of International Application No. PCT/AU97/00835, filed on Dec. 9, 1997, now abandoned.

FIELD OF THE INVENTION

The present invention relates to filtration processes and apparatus of the kind using microporous membranes, wherein feed containing contaminant matter is applied under pressure to a feed receiving surface of the membrane for passage therethrough and wherein filtrate is withdrawn from the permeate side of the membranes.

More particularly, the invention relates to systems using microporous filters comprising elongate bundles of microporous polymeric fibres, wherein feed to be filtered is fed to the outside of the bundles of fibres and permeate is extracted from the ends of the fibre lumens. The systems also preferably incorporate a backwashing facility for periodic cleansing of the feed surfaces of the fibres.

BACKGROUND OF THE INVENTION

Typical prior art filter systems of the type described above generally include elongate tubular cartridges enclosing a bundle of the microporous hollow fibres. Manifold or header arrangements are then used to connect the cartridges, usually at one or both ends, these manifolds acting to separate and divert the respective flows of contaminated feed and permeate through the system. In this regard, cross-flow systems typically have two feed manifolds (inlet and re-circulation outlet) and one or two permeate manifolds. In cross-flow filtration systems of the prior art the stream to be filtered, flows tangential to or across the surface of the membrane. This generates a sweeping action at the membrane surface, keeping the surface cleaner. Conversely, systems configured for dead end operations have only one feed inlet manifold and one permeate outlet manifold. Further, these prior art manifolds or header arrangements are often configured to facilitate the construction of modular two or three dimensional cartridge arrays.

It should be noted that these systems operate under significant internal pressures. Accordingly, the cartridge casings and header manifold structures need to be made from high strength, and thereby correspondingly high cost, materials such as stainless steel and higher grade reinforced plastic materials specifically designed to withstand these pressures.

Most of the prior art designs available to date have proved satisfactory for small to medium scale applications. However, as there is now an increasing demand for larger scale systems, the current structures are proving to be prohibitively expensive due, for example, to the additional amount of connecting pipe work required and the costs of the componentary associated with each individual cartridge.

When attempting to design larger systems, it is not simply a matter of scaling up all the individual components. This is due, in part, because it is preferred that the individual constituents of the system remain sized so as to be readily man handlable for the purpose of assembly and maintenance. Further, as the structures themselves and associated flow paths get larger, the problems with pressure drops through the system become more significant.

It is an object of the present invention to provide a modified filtration assembly of the kind herein before described which overcomes or substantially ameliorates at least some of the disadvantages of the prior art or at least offers a useful alternative thereto.

DISCLOSURE OF THE INVENTION

According to a first aspect of the invention there is provided a filter assembly comprising:

an elongate housing having two or more discrete filter bundle lengths disposed end to end in a series configuration, each filter bundle comprising a multitude of parallel microporous polymeric hollow fibres, wherein feed to be filtered is fed to the outside of the bundle of fibres and permeate is extracted from one or both discharge ends of the fibre lumens;

one or more feed passages extending longitudinally along said housing to direct feed to said filter bundle lengths in a direction generally parallel thereto;

one or more longitudinally extending permeate return passages extending generally parallel to said filter bundle length, said permeate return passages being sealed from contact with said feed and adapted to be in free fluid flow communication with each of said permeate discharge ends of said fibre lumens in said filter bundle lengths; and one or more manifold arrangements, each having a feed inlet port connecting with said one or more longitudinally extending feed passages and a separate permeate outlet port connected with said one or more permeate return-passages.

In a preferred form, the manifold arrangements are disposed at one or both longitudinal ends of said housing and are configured to connect a plurality of the filter assemblies into banks.

Advantageously, the housing can include two, three or four filter bundle lengths disposed end to end in a series configuration. More preferably, each longitudinal length of the housing also has therein two or more co-extending filter bundle lengths that are each similarly connected in series to adjacent filter bundle lengths. In this manner, large systems can be constructed using filter bundle lengths or submodules that are of a size that are readily manhandable.

In one form co-extensive filter bundle lengths are interconnected as a subassembly of multiple filter bundle lengths. Preferably, each bundle length is separately potted in the conventional manner described in more detail hereafter.

In yet other forms, the invention provides an elongate housing containing at any one point four co-extensive filter bundles with three or four such filter bundle lengths connected in series. In a preferred form a peripheral feed passage is provided that is generally parallel to the external walls of the housing that is desirably no more than about 15 mm in radial depth at any point, together with a central feed passage that passes through the centre of the four co-extensive filter bundle lengths. In one form, the peripheral feed passage and/or central feed passage may be configured, by the use of packing material for example, to assist in directing the flow of feed both around and into the filter bundles.

It is further preferred that four separate permeate return tubes are provided that are equally spaced within the housing intermediate the central and peripheral feed passages.

Manifold arrangements in the form of headers are preferably provided at both longitudinal ends of the housing to facilitate cross-flow filtration, wherein a portion of the feed can be discharged from the other end for recirculation. The feed outlet port can also be used as a flushing fluid inlet port for operation during the backwashing process, wherein fluid under pressure is applied to the inner surface of the fibre lumens via the filtrate or permeate outlet ports and a backwashing fluid is subsequently applied to the external surfaces of the fibres to flush out any accumulated contaminants that may have been dislodged from the fibres.

It is also preferred, particularly in systems utilising large diameter filter bundles, to provide feed passages through the centre of each individual filter bundle.

Finally, other preferred forms of the invention could also include means to isolate individual filter assemblies or banks of assemblies in the event of failure of a filter bundle. This is achieved in one embodiment by means of individual valves associated with each filter bundle length, filter assembly housing, or manifold arrangement, as required.

BRIEF DESCRIPTION OF THE DRAWINGS

A preferred embodiment of the invention will now be described, by way of example only, with reference to the accompanying drawings in which:

FIG. 6 is a schematic side view of a three dimensional array constructed using the modules illustrated in the previous Figures;

FIG. 7 is an end view of the filter assembly shown in FIG. 6;

PREFERRED EMBODIMENT OF THE INVENTION

Figure 5:
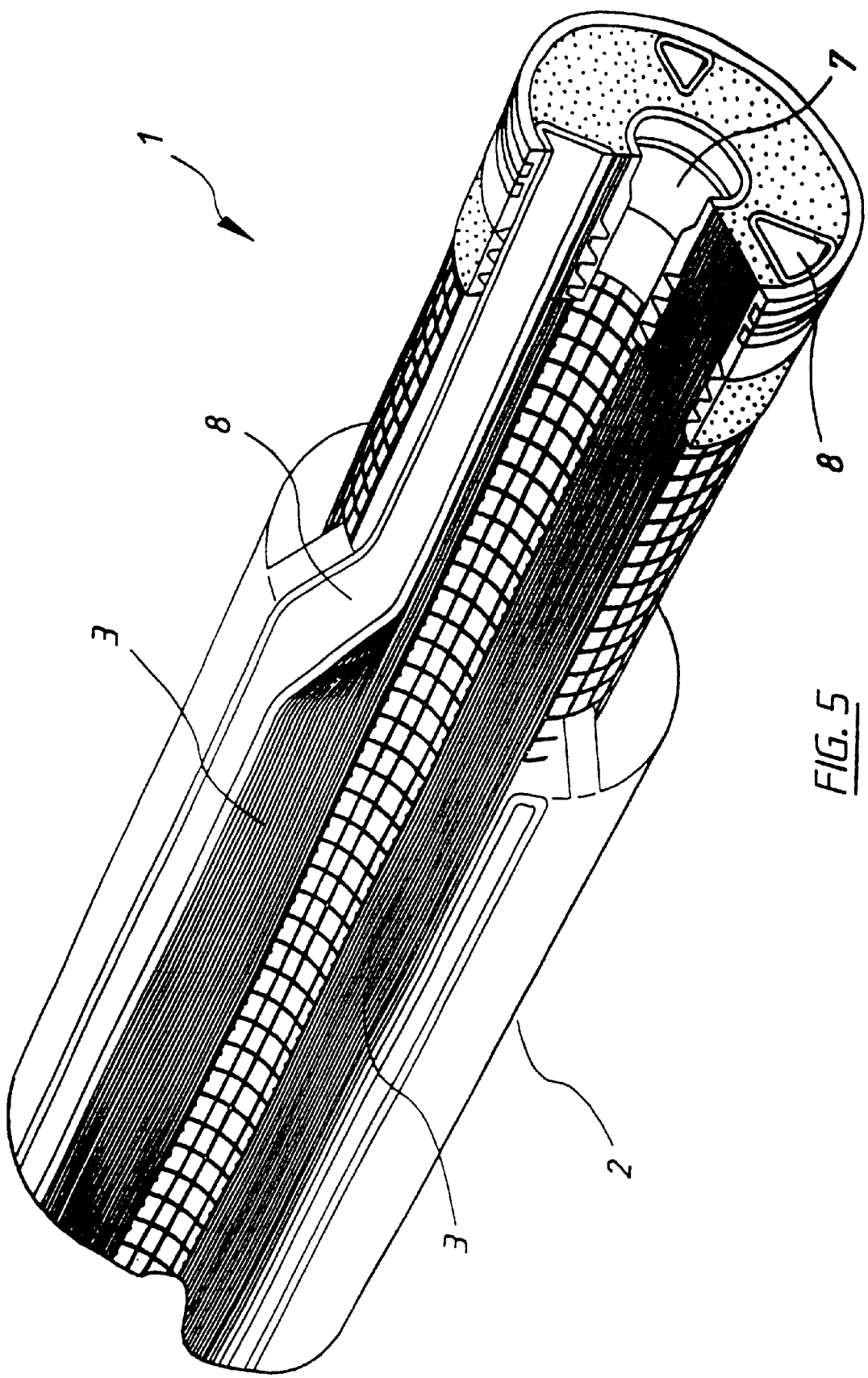
FIG. 5 is a cut away perspective part view of a second embodiment filtration module having three filter bundles and three filtrate return passages.

Referring to the drawings, the filter assembly 1 includes an elongate housing 2 having therein a plurality of filter bundles 3 disposed end to end in a series configuration. In the embodiment illustrated in FIGS. 1 and 2, there are 4 sets of coextending filter bundles each connected in series to an adjacent four sets of filter bundles. A similar arrangement is shown in FIG. 5 utilising only three co-extensive filter bundles. At this stage, the use of either two or four co-extensive filter bundles lengths is preferred.

Each filter bundle comprises a multitude of micro-porous polymeric hollow fibres of the kind wherein feed to be filtered is fed to the outside of the bundle of fibres and permeate is extracted from one or both permeate discharge ends 4 of the fibre lumens. These bundles are usually "potted" at the discharge ends to readily facilitate separation of the permeate from the feed and simultaneously retain the fibres in assembled bundles.

The preferred potting material is urethane, which is a thermo setting polymer. A shallow pre-pot tray is provided in the final peripheral shape required, that has a plurality of long spaced apart spikes. The fibres are arranged in the tray and the resin is cast, blocking off the fibre lumens at the end. The pre-pot trays are then removed and the bundle is placed into a centrifuge with second pot moulds, and additional urethane is introduced via the holes in the pre-pot moulding formed by the spikes. Once the second pot has cured, the pre-pot end section plus a section of the second pot is sliced off, thereby clearly exposing the ends of the fibre lumens.

Figure 2:
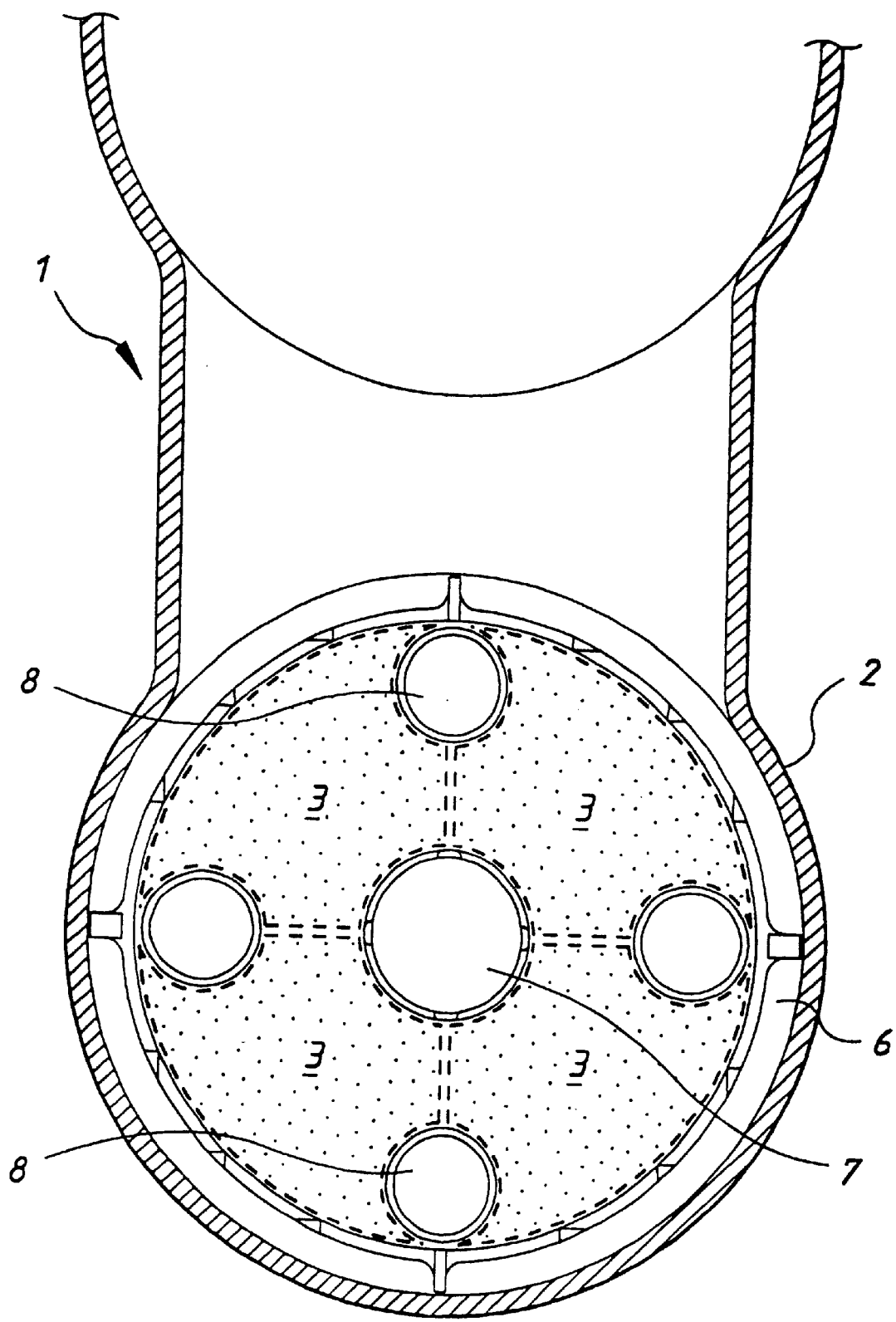
FIG. 2 is a transverse section taken on line 2—2 of FIG. 1.
Figure 3:
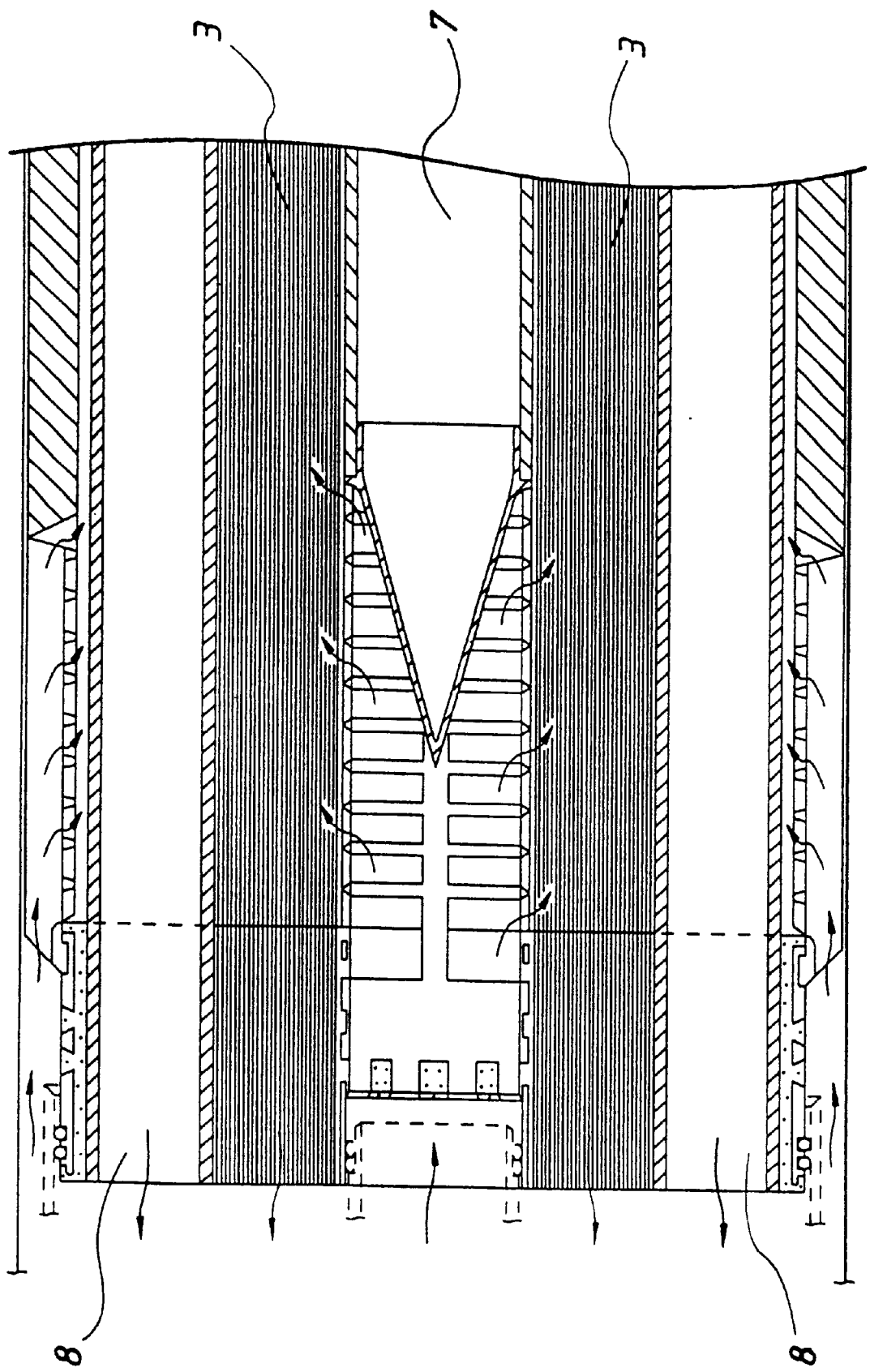
FIG. 3 is a more detailed longitudinally sectioned part view of a very similar system to that shown in FIG. 1.
Figure 4:
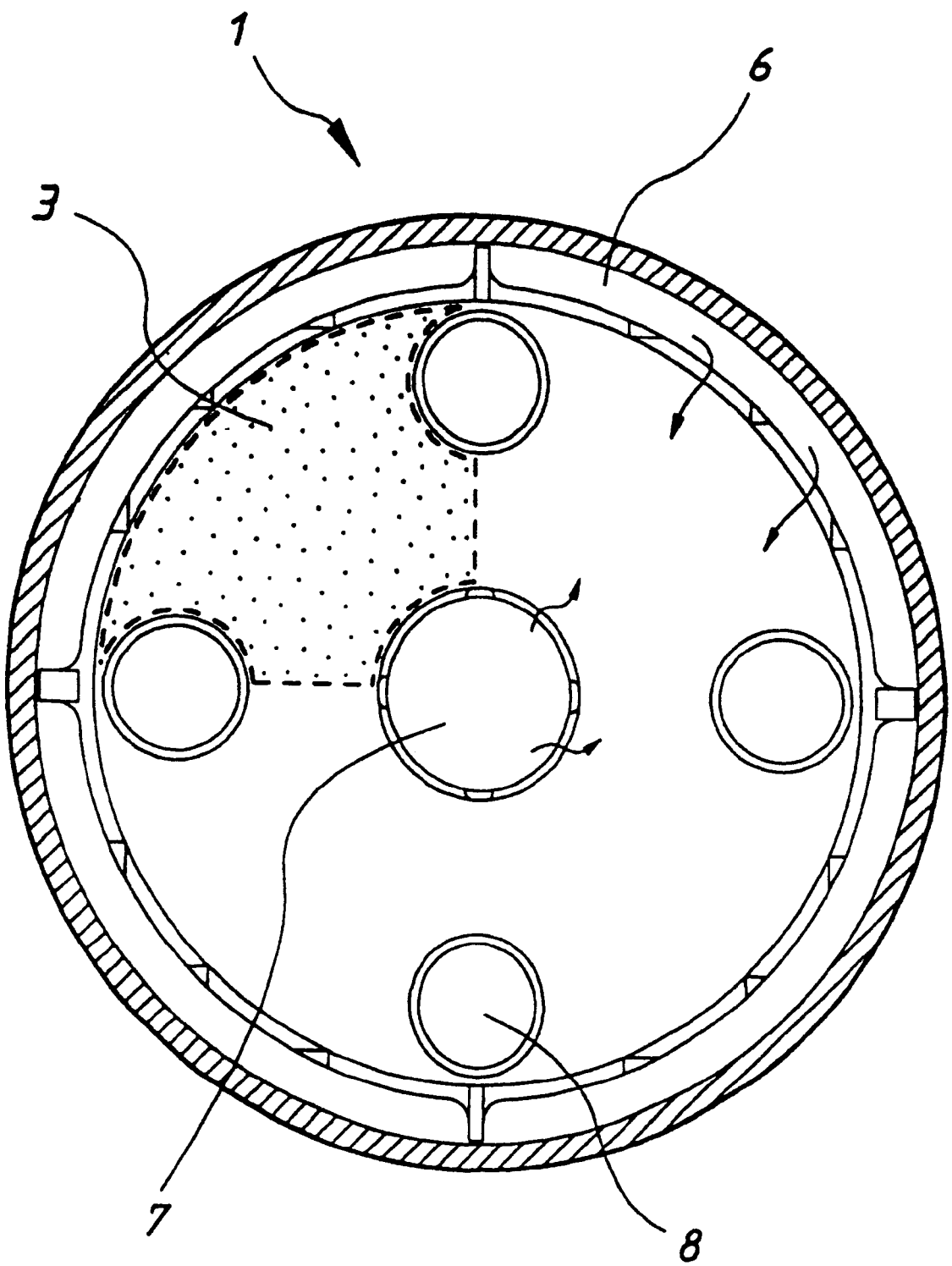
FIG. 4 is an enlarged detailed transverse section of the system shown in FIG. 3.

Also provided within the housing are one or more longitudinally extending feed passages. In the embodiment illustrated in FIGS. 1 and 2, the feed passages comprise a generally annular outer feed passage 6 (of preferably no more than about 15 mm) that extends around the periphery of the groups of filter bundles 3 and a central feed passage 7 that extends through the central core of the housing. In the embodiments illustrated in FIGS. 3 to 5, the bundles have an outer casing including packing means that extends up to the periphery of the outer housing, the casing including means to direct the flow of feed both around and into the filter bundles. The central feed passage may similarly include formations in the form of baffles and the like for diverting the feed both into and around the filter bundles as shown in FIG. 3.

Figure 1:
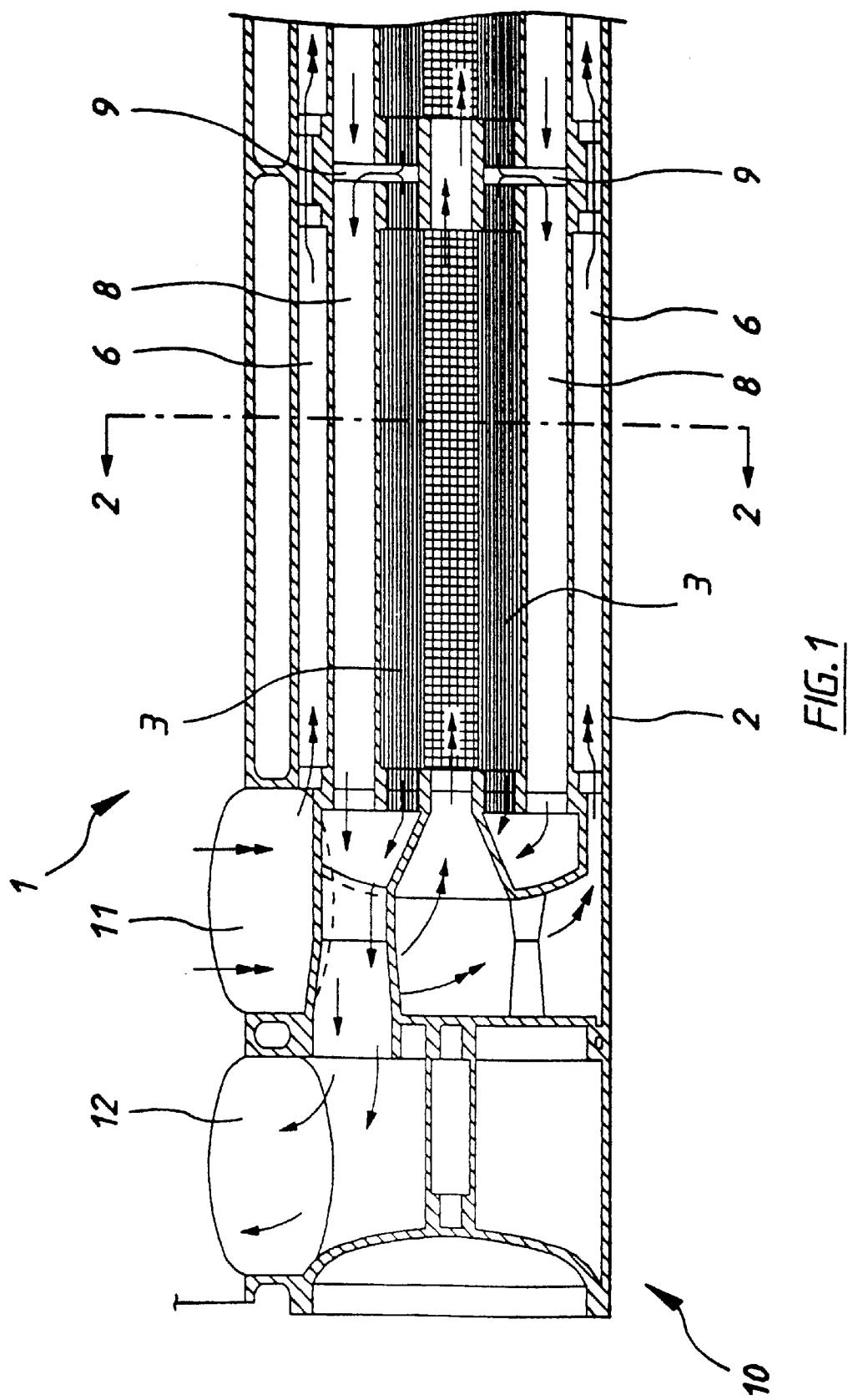
FIG. 1 is a longitudinally sectioned part view of a first embodiment filtration system according to the invention having four co-extensive filter bundles and filtrate return passages.

One or more longitudinally extending permeate return passages 8 are also provided which similarly extend parallel to the filter bundles, each of the permeate return passages being in fluid flow communication with each of the permeate discharge ends 4 of the fibre lumens via connecting passages 9 (see FIG. 1). Means in the form of valves or the like may also be provided (not shown) for selectively isolating an individual filter bundle, filter assembly housing, or manifold arrangement in the event of failure.

Disposed at one or both longitudinal ends of each housing 2 is a manifold or header arrangement shown generally at 10. Each header includes a feed inlet port 11 that is in fluid flow communication with the longitudinally extending feed passages 6 and 7, and a permeate outlet port 12 which is in sealed and separate communication with the permeate return passages 8.

Referring in particular to FIGS. 6 and 7, it can be seen how the arrangement of the previous Figures can be built up in a modular construction by connection of suitably configured headers to form large, yet highly compact, three dimensional arrays from a number of two dimensional banks.

In use, the system operates in substantially the same manner as the prior art filtration processes. Where there is provision for backwash facilities, the system outlet is shut off and fluid is applied under pressure to the permeate to discharge outlet in a manner whereby it is passed through the membranes to dislodge contaminants that have accumulated on the outer feed surfaces. A flushing fluid, which is often feed, is then usually applied to the cross-flow feed outlet port for passage through the system so as to flush out any dislodged contaminant matter.

It can be seen that the system according to the invention provides a means of substantially increasing the packing density of the filter fibre bundles whilst simultaneously reducing the overall cost of the system by minimising the number of expensive header arrangements and connecting pipe work. For example, experimentation carried out by the applicant has indicated that the present invention can result in a system that is 40% less expensive and 60% smaller than a plant employing the applicants current M10C technology.

Figure 8:
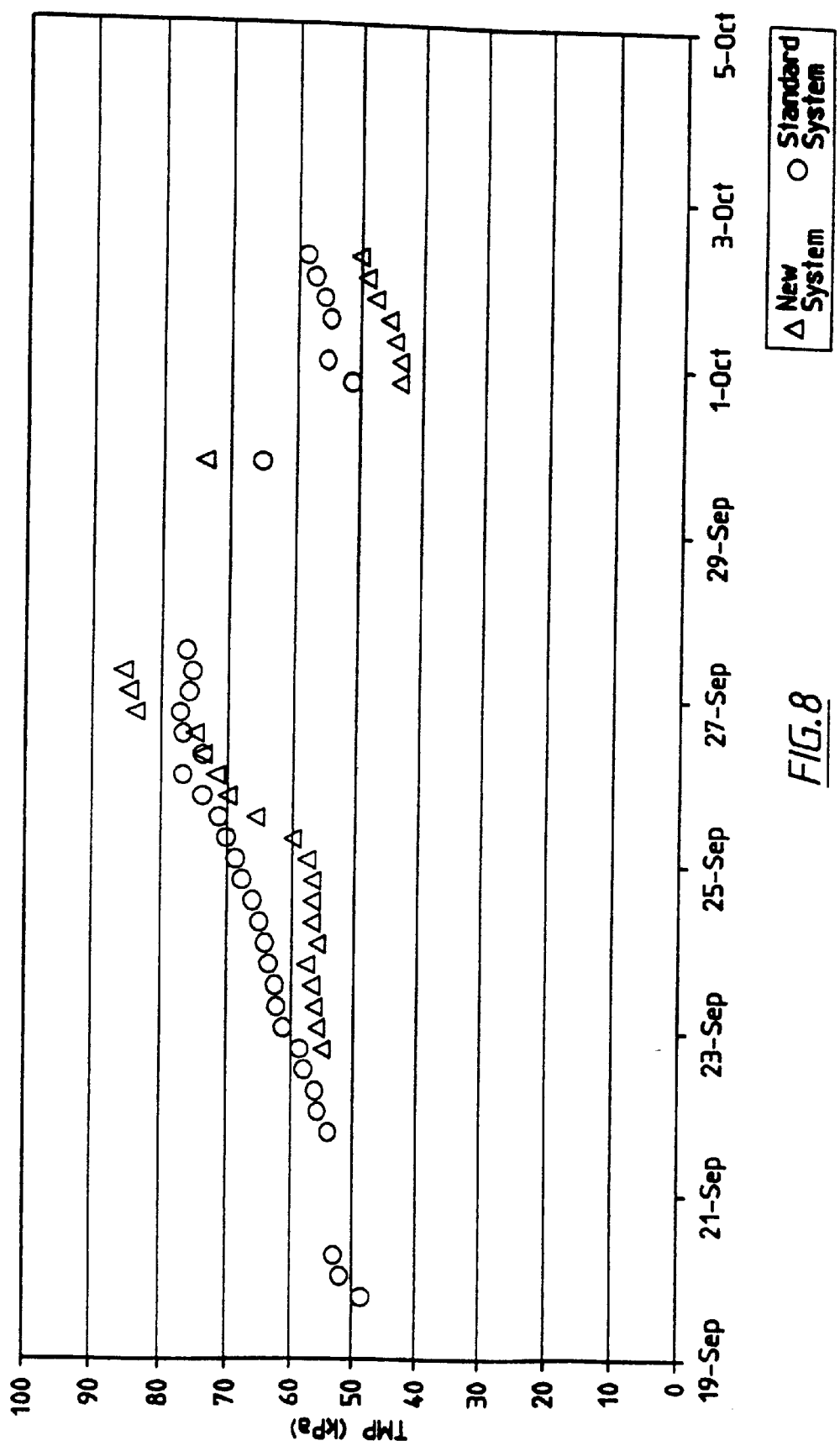
FIG. 8 is a first graph showing the results of a first performance comparison test of trans membrane pressure drop for the present invention against the applicants standard M10C filtration system.
Figure 9:
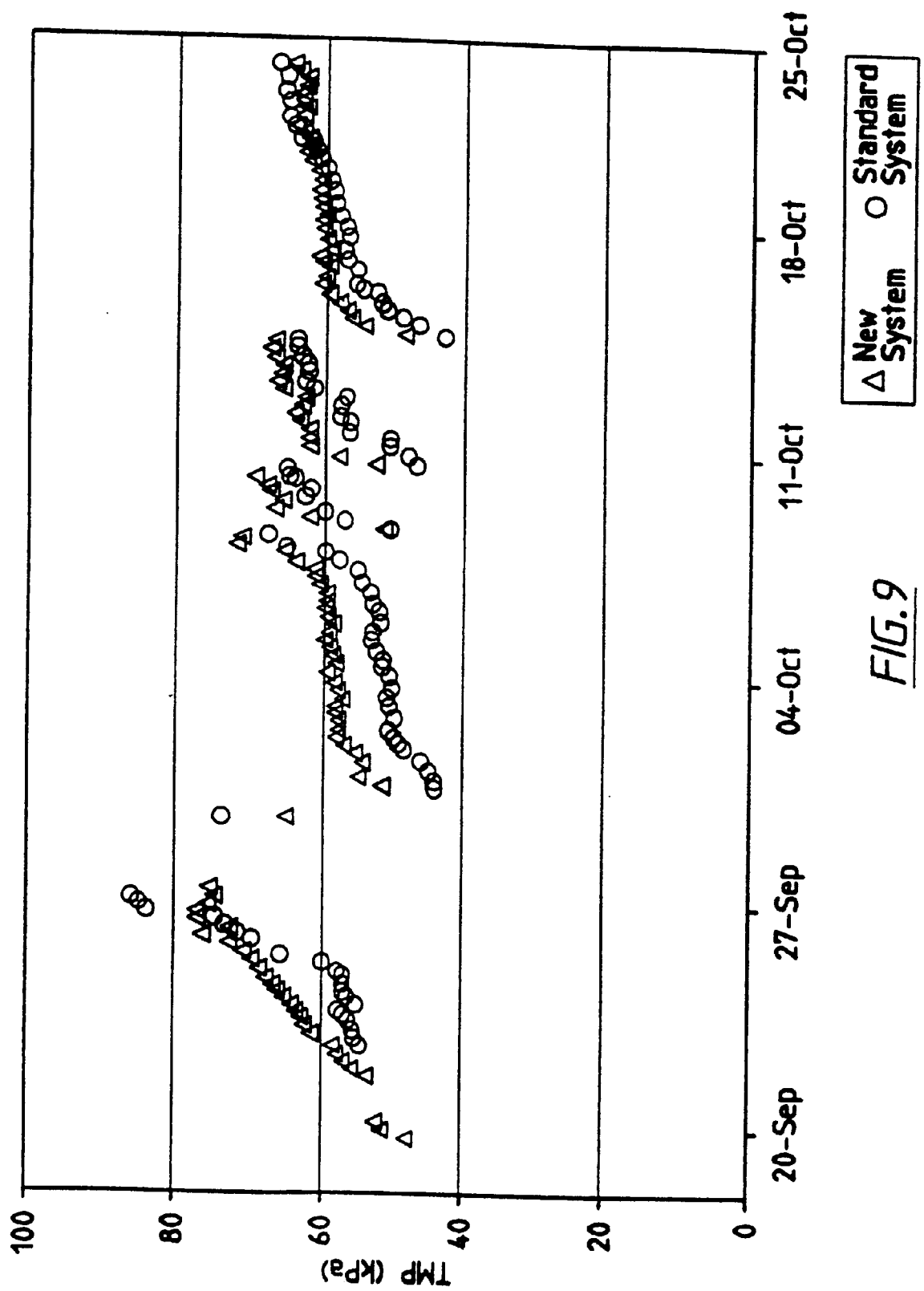
FIG. 9 is a second graph showing the results of a second performance comparison test of trans membrane pressure drop for the present invention against the applicants standard M10C filtration system.

Furthermore, tests have shown there is little or no compromise in the operating efficiency, as potential pressure drop problems are reduced by the provision of the feed passages and the permeate connecting passages 9 which allow the permeate to discharge to the permeate return passages at each discharge end of the filter bundles. See for example FIGS. 8 and 9 which show that for the same flux (ie flow rate per unit area) the trans membrane pressure drop (TMP) for the system of the invention would be comparable to that of the applicants significantly more costly current M10C technology. This provision of the intermediate permeate connecting passages also helps overcome pressure drop problems that would ordinarily be encountered during the backwash cycle.

It has also been observed that the present invention enables a significant reduction in backwash volume as compared to the applicants MIOC technology particularly with respect to the sweep stage, as in theory at least, the same volume of sweeping fluid is required to flush out dislodged contaminants for four bundles in series, as is required for only one bundle. It also appears that the system of the invention is potentially capable of higher flow rates for a given physical size than most of the relevant prior art systems.

Whilst the invention has been described with reference to specific examples, it will be appreciated by those skilled in the art, that the invention may be embodied in many other forms.

What is claimed is:

1. A filter assembly comprising:
    an elongate housing having a longitudinal length and a plurality of filter units, each filter unit comprising two or more discrete co-extending filter bundle lengths disposed side by side in a parallel configuration, wherein each filter unit is disposed end to end in a series configuration with an adjacent filter unit, each filter bundle length comprising a multitude of parallel microporous polymeric hollow fibres, wherein feed to be filtered is fed to the outside of the bundle of fibres and permeate is extracted from one or both discharge ends of the fibre lumens, and wherein feed freely circulates between co-extending filter bundle lengths;
    one or more feed passages extending longitudinally along said housing to direct feed to said filter bundle lengths in a direction generally parallel thereto;
    one or more longitudinally extending permeate return passages extending generally parallel to said filter bundle lengths, said permeate return passages being sealed from contact with said feed and adapted to be in free fluid flow communication with each of said permeate discharge ends of said fibre lumens in said filter bundle lengths; and
    one or more manifold arrangements, each having a feed inlet port connecting with said one or more longitudinally extending feed passages and a separate permeate outlet port connected with said one or more permeate return passages.

2. A filter assembly according to claim 1, wherein said manifold arrangements are disposed at one or both longitudinal ends of said housing and are adapted to connect a plurality of filter assemblies into banks.

3. A filter assembly according to claim 1 wherein said housing includes between two and four filter units disposed end to end in a series configuration.

4. A filter assembly according to claim 1 including transversely extending permeate connecting passages provided at each discharge end of the filter bundles to direct permeate from the fibre lumens to the permeate return passages.

5. A filter assembly according to claim 1, wherein each filter unit contains three or four co-extensive filter bundle lengths, the system including at least one generally peripheral feed passage located in the housing generally parallel to the external walls thereof, and a central feed passage that passes through the centre of the three or four co-extensive filter bundles.

6. A filter assembly according to claim 5, wherein said housing includes three or four separate permeate return tubes, equally spaced within said housing, intermediate said central and peripheral feed passages.

7. A filter assembly according to claim 1, wherein said manifold arrangements are in the form of headers located at both longitudinal ends of said housing thereby facilitating cross-flow filtration wherein a portion of the feed is discharged from the end remote the feed inlet for recirculation.

8. A filter assembly according to claim 1, wherein said feed outlet port is adapted for use as a flushing fluid inlet port for operation during a backwashing process, wherein fluid under pressure is applied to the inner surface of the fibre lumens via the permeate outlet ports and a backwashing fluid is subsequently applied to the external surfaces of the fibres via the flushing fluid inlet port, to flush out any accumulated contaminants that may have been dislodged from the fibres.

9. A filter assembly according to claim 1 utilizing large diameter filter bundles, wherein the system includes additional feed passages through the centre of each filter bundle length.

10. A filter assembly according to claim 1 including means to isolate individual filter bundles or banks of filter bundles in the event of failure of a filter bundle length.

11. A filter assembly according to claim 10, wherein said isolation means includes individual valves associated with each filter bundle, or filter assembly housing, or filter assembly manifold arrangement.

12. A filter assembly according to claim 1, wherein packing is provided intermediate the filter bundles and the housing which is configured to assist in directing the flow of feed both around and into the filter bundles.

* * * * *